United States Patent Office 3,379,676
Patented Apr. 23, 1968

3,379,676
CERTAIN TRIAZINES AS STABILIZERS
FOR POLYAMIDES
Stanley Ashton, Ronald James Hurlock, and Gerald Scott, Manchester, England, assignors to Imperial Chemical Industries Limited, London, England, a corporation of Great Britain
No Drawing. Filed Sept. 27, 1965, Ser. No. 490,724
Claims priority, application Great Britain, Sept. 29, 1964, 39,586/64
12 Claims. (Cl. 260—45.8)

ABSTRACT OF THE DISCLOSURE

The heat stabilization of fibre-forming synthetic polyamides, such as the various nylons, is disclosed. The polyamides are stabilized by the addition of a stabilizing amount of a triazine compound of the formula:

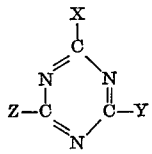

Wherein Z is an arylene diamine radical joined to the triazine ring through a nitrogen atom, and X and Y are each chlorine, bromine, hydroxyl or Z.

---

This invention relates to a method of improving the heat stability of fibre forming synthetic linear polyamides.

Fibre-forming synthetic polyamides, usually referred to under the generic name nylon, are susceptible to exposure to high temperature especially in presence of oxygen. It has now been found that the stability of nylon to heat, and especially the stability to heat of polyhexamethyleneadipamide, can be improved by adding to the nylon a proportion of a compound of the following general formula:

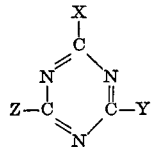

Formula I wherein Z is an organic radical joined to the triazine ring through a nitrogen atom of the said radical and is the residue of an organic amino compound known from the literature to have anti-oxidant properties, and X and Y are halogen, hydroxyl or an organic radical, which may be the same as or different from Z.

Thus our invention provides fibre-forming synthetic linear polyamide compositions comprising a fibre-forming synthetic linear polyamide, said polyamide being a condensation product containing recurring amide groups as integral parts of the main polymer chain and a triazine of the formula:

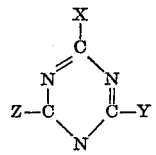

Formula I in which Z represents an organic radical joined to the triazine ring through a nitrogen atom of the said radical, the said radical being the residue of an organic amino compound known from the literature to have antioxidant properties, and X and Y each independently represents a halogen atom, an hydroxyl group or an organic radical which may be the same as or different from Z.

The triazines of Formula I are novel compounds and form an additional feature of our invention.

Organic amino compounds known from the literature to have antioxidant properties are those for example described by Scott in Chemistry and Industry, 1963, 7, 271.

Fibre-forming synthetic linear polyamides include polyhexamethylene adipamide (nylon 66) and polycaprolactam (nylon 6).

Particularly suitable triazine derivatives for use in forming the polyamide compositions of our invention are those in which the organic radical Z is the residue of an arylenediamine in which one of the amino groups is a primary amino group. Particularly preferred are those triazines in which the organic radical Z is the residue of an arylenediamine of the formula:

$NH_2$·arylene NRR' in which R and R' each independently represents an alkyl or a substituted alkyl group or R represents an aryl radical and R' represents a hydrogen atom or an alkyl or substituted alkyl group. An especially preferred class of triazines is that in which the organic radical Z is the residue of an aminodiphenylamine, especially an aminodiphenylamine of the formula:

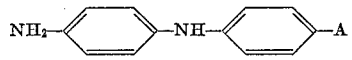

in which A represents a hydrogen atom or an alkyl group. The alkyl group A preferably contains up to 12 carbon atoms and may be branched.

The halogen atoms represented by X or Y in the above Formula I for the triazines are chlorine or bromine atoms.

The organic radical represented by X and Y in the above Formula I for the triazines may be any organic radical and is joined to the triazine ring through a carbon, nitrogen, oxygen or sulphur atom of the said radical. When X or Y represent an organic radical we prefer that the organic radical is the same radical as Z.

In the especially preferred class of triazines in which the organic radical Z is the residue of an aminodiphenylamine we prefer that X and Y each independently represents a halogen atom, an hydroxyl group or the organic radical Z. Examples of such triazines are those obtained by reacting one mole of cyanuric chloride with 1 to 3 moles of 4-aminodiphenylamine, 4-amino-4'-t-butyldiphenylamine and 4-amino-4'-t-octyldiphenylamine.

Methods for preparing the triazines used in the polyamide compositions of our invention are in general already known. Those of the above Formula I in which X and Y each independently represents a halogen atom or an organic radical may be obtained by reacting a triazine of the formula:

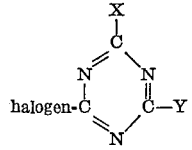

with the organic amino compound from which the radical Z is derived. Thus when both X and Y represent a halogen atom the triazines may be obtained by reacting cyanuric chloride or bromide with one mole of the said amino compound. Those triazines of Formula I in which X represents an organic radical the same as Z and Y represents a halogen atom may be obtained by reacting cyanuric chloride or bromide with two moles of the amino compound; and those triazines of Formula I in which both X and Y represent an organic radical the same as Z may be obtained by reacting cyanuric chloride or bromide with three moles of the amino compound. The reactions with cyanuric chloride or bromide are preferably carried out in the presence of an acid-binding agent.

Those triazines of Formula I in which X and/or Y represents an hydroxyl group may be obtained by reacting the corresponding triazines in which X and/or Y represents a halogen atom with an alkali.

The polyamide compositions of the invention may include known antioxidants (e.g. phenols; phosphite esters, dithiocarbamates) to give improved staining characteristics.

The polyamide compositions of our invention may be obtained by mixing the triazine with the polyamide, for example the triazine may be added to the polyamide in the molten state. Alternatively the triazine may be added to the components of the polyamide before condensation is effected, or may be added at some stage during the condensation itself, and the condensation then effected or completed to give the polyamide/triazine composition. Usually the polyamide composition contains from 0.05 part to 5 parts by weight of the triazine per 100 parts by weight of polyamide.

The efficiency of the triazines as heat stabilisers for the polyamides may be measured by heating the polyamides containing the stabiliser and measuring the number of amine end groups in the polymer before and after heating in comparison with a polyamide containing no stabiliser. Loss of amine end groups indicates heat damage, and retention of amine end groups indicates successful stabilisation. Alternatively as a measure of stability the Relative Viscosity (R.V.) can be measured before and after heating, a decrease in R.V. indicating loss in stability. R.V. is a measure of molecular weight and is defined as the viscosity of an 8.4% solution of the polymer relative to that of the solvent (90% formic acid). A further method of assessing heat stability is to measure oxygen uptake, a high oxygen uptake indicating deterioration as a result of exposure to heat.

The invention is illustrated but not limited by the following examples in which the parts and percentages are by weight except where otherwise stated, and in which the ratio of parts by weight to parts by volume is that of the kilogram to the litre.

EXAMPLE 1

Solutions of cyanuric chloride (74.0 parts) in acetone (150 parts by volume), and sodium carbonate (21.2 parts) in water (200 parts) were added simultaneously to a stirred solution of 4-aminodiphenylamine (73.6 parts) in acetone (150 parts by volume) at a temperature between 0° and 5° C. The reaction mixture was stirred for 1 hour at 0° C. and the product filtered off, washed with water and dried to give 4-(4,6-dichlorotriazin-2-yl) aminodiphenylamine as a yellow solid M.P. 146°.

(Found: C, 55.5; H, 3.8; N, 21.0; $C_{15}H_{11}N_5Cl_2$ requires C, 54.2; H, 3.3; N, 21.1%.)

EXAMPLE 2

A mixture of 4 - (4,6 - dichloro-2-ylamino)diphenylamine (33.2 parts) and sodium acetate ($CH_3CO_2Na.3H_2O$)

(27.2 parts) in water (200 parts) was boiled under reflux for 5 hours. The yellow solid was filtered off, washed and dried to give 4 - (4,6 - dihydroxytriazin - 2 - ylamino) diphenylamine.

EXAMPLE 3

Solutions of cyanuric chloride (18.45 parts) in acetone (50 parts by volume) and sodium carbonate (10.3 parts) in water (100 parts) were added simultaneously to a stirred solution of N-ethyl-N-hydroxyethyl-p-phenylenediamine (18.0 parts) in acetone (100 parts by volume) at 0°. After 2 hours at 0° C. the solid product was filtered off, washed and dried to give 4-N-(4,6-dichlorotriazin-2-ylamino) - N' - ethyl - N' - hydroxyethyl-p-phenylenediamine as a yellow solid, M.P. 116–118°.

(Found: N, 20.5; $C_{13}H_{15}N_5OCl_2$ requires N, 21.3%.)

EXAMPLE 4

A solution of cyanuric chloride (18.45 parts) in acetone (100 parts by volume) was added dropwise at 0–5° C. to a solution of sodium hydroxide (8.0 parts) in water (200 parts). A solution of 4-aminodiphenylamine (37.8 parts) in acetone (100 parts by volume) was then added at 0–5° C. and the reaction mixture stirred for 30 minutes. The temperature was raised to 45° C. for 2 hours and the grey product, 2-chloro-4,6-di-(4-N-phenylamino) anilinol-1,3,5-triazine, filtered off. (41.5 parts), M.P. >320° C.

EXAMPLE 5

4-ethyl-4-(4,6-dichlorotriazin - 2 - yl)aminodiphenylamine was prepared by the same procedure as for Example 1 except that 4'-ethyl-4-aminodiphenylamine was used instead of 4-aminodiphenylamine.

EXAMPLE 6

4'-t-butyl-4-(4,6 - dichlorotriazin-2-yl)aminodiphenylamine was made by the same procedure as Example 5 starting from 4'-t-butyl-4-aminodiphenylamine.

EXAMPLE 7

4'-t-octyl-4-(4,6-dichlorotriazin - 2 - yl)aminodiphenylamine was made by the same procedure as Example 5 starting from 4'-t-octyl-4-aminodiphenylamine. The product had a M.P. >300° C.

EXAMPLE 8

A stainless steel autoclave was charged with:

| | |
|---|---|
| 66 salt (hexamethylenediamine adipate) _____g__ | 8000 |
| Water _____mls.__ | 3000 |
| Aqueous acetic acid (0.2 g./ml.) _____mols__ | 48.5 |
| 4,6 - dichlorotriazin-2-ylaminodiphenylamine (the product of Example 1) _____g__ | 6.6 |

The mixture was subjected to the following polymerisation conditions:

| Heating Stage | Time | Temperature | Pressure |
|---|---|---|---|
| 1 | 2 hours | Room→210° C. | 1 atmosphere→250 p.s.i. |
| 2 | 1 hour | 210° C.→225° C. | 250 p.s.i. (maintained by bleed off of steam). |
| 3 | 1 hour | 225° C.→265° C. | 250 p.s.i.→1 atmosphere. |
| 4 | 35 mins | 265° C.→285° C. | 1 atmosphere. |

The polymer was extruded as a ribbon, quenched in water and the ribbon obtained cut into chips. The chips were melt-spun under steam at 290° C. and the yarn drawn 3.7 times its original length, to give a 70 denier yarn having 20 filaments. The thermal stability of this yarn was then compared with a control yarn which did not contain stabiliser.

Measurement of amine end group loss

The yarns were fed continuously through a heated chamber such that they were subjected to a heat treatment of 220° C. for 30 seconds in air. The amine end groups of the yarns were measured before and after the heat treatment and the results were as follows:

| | Initial A.E.G./ $10^6$ g. | Final A.E.G./ $10^6$ g. |
|---|---|---|
| Yarn containing 4,6-dichlorotriazin-2-ylaminodiphenylamine | 41.9 | 38.1 |
| Control yarn | 43.0 | 30.0 |

It is seen that under these heating conditions, the yarn containing stabiliser lost only about 4 A.E.G./$10^6$ g. compared with 13 A.E.G./$10^6$ g. for the control. This is a significant improvement in heat stability of the amine end groups.

Measurement of change in R.V. and oxygen uptake

The yarns were heated at 150° C. in air for 2 hours and the oxygen uptake measured. In addition, the relative viscosity was also meaured before and after heating. The results were:

|  | Initial R.V. | Final R.V. | Oxygen Uptake per 10 g. of yarn |
|---|---|---|---|
| Yarn containing 4,6-dichloro-triazin-2-ylaminodiphenylamine. | 38.8 | 38.5 | 6 ml. (N.T.P.). |
| Control Yarn | 30.3 | 21.5 | 24 ml. (N.T.P.). |

These results show that 4,6-dichlorotriazin-2-ylaminodiphenylamine is a powerful inhibitor of the chain-scission reaction which normally occurs when nylon 66 yarn is heated in air.

EXAMPLE 9

The procedure of Example 8 was repeated except that the stabilisers listed in colum I of the following table were used in place of 4,6-dichlorotriazin-2-ylaminodiphenylamine. Measurement of amine end group loss was made as in Example 8.

| I Stabiliser | II A.E.G./ $10^6$ g. | III Final A.E.G. $10^6$ g. | IV Loss of A.E.G. | V Percent Loss of A.E.G. |
|---|---|---|---|---|
| 4,6-dihydroxytriazin-2-yl-aminodiphenyl-amine | 33.0 | 29.6 | 3.4 | 10.3 |
| N-(4,6-dichlorotriazin-2-yl-amino)-N'-ethyl-N'-hydroxyethyl-p-phenylenediamine | 37.9 | 28.1 | 10.1 | 26.6 |
| 4'-ethyl-4(4,6-dichlorotriazin-2-yl)amino-diphenylamine | 43.9 | 39.4 | 4.5 | 10.3 |
| 4'-t-butyl-4(4,6-dichlorotriazin-2-yl)aminodiphenylamine | 56.0 | 45.0 | 11.0 | 19.6 |
| 4'-t-octyl-4(4,6-dichlorotriazin-2-yl)amino-diphenylamine | 56.5 | 47.4 | 9.1 | 16.1 |
| 2-chloro-4,6-di-(4-N-phenylamino)anilino-1,3,5-triazine | 44.6 | 39.4 | 5.2 | 11.7 |
| 2,4,6-tris-(4-N-phenylamino)-anilino-1,3,5-triazine | 44.7 | 40.2 | 4.5 | 10.1 |
| Control (no antioxidant) | 41.8 | 25.4 | 16.4 | 39.2 |

EXAMPLE 10

The procedure of Example 8 was repeated except that the stabilisers listed in column I of the following table were used in place of 4,6-dichlorotriazin-2-ylaminodiphenylamine.

Measurement of change in R.V. and oxygen uptake was effected as follows:

The yarns were heated at 185° C. in the air for 2 hours and the oxygen uptake measured. In addition, the relative viscosity was also measured before and after heating. The results were as follows:

| I Stabiliser | II Initial R.V. | III Final R.V. | IV O₂ Uptake (ml.) per 10 g. of yarn at N.T.P. |
|---|---|---|---|
| 2-chloro-4,6-di-(4N-phenylamino) anilino-1,3,5-triazine | 37.3 | 24.7 | 15.6 |
| 2,4,6-tri-(4-N-phenylaminoanilino,1-3,5-triazine | 36.9 | 37.2 | 5.1 |
| Control (no antioxidant) | 33.7 | 9.1 | 138.6 |

We claim:

1. Fibre-forming synthetic linear polyamide compositions comprising a fibre-forming synthetic linear polyamide, said polyamide being a condensation product containing recurring amide groups as integral parts of the main polymer chain, and a triazine of the formula:

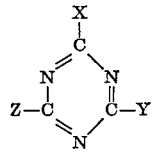

in which Z represents an arylene diamine radical joined to the triazine ring through a nitrogen atom of the said radical and X and Y each independently represents a member selected from the group consisting of chlorine and bromine atoms, hydroxyl groups and Z.

2. Polyamide compositions according to claim 1 in which the fibre-forming synthetic linear polyamide is polyhexamethylene adipamide.

3. Polyamide compositions according to claim 1 in which Z is the residue of an arylenediamine in which one of the amino groups is a primary amino group.

4. Polyamide compositions according to claim 3 in which the arylenediamine is an arylenediamine of the formula:

$$NH_2.\text{arylene } NRR'$$

in which R and R' each independently represents a member selected from the group consisting of alkyl groups and hydroxyl-substituted alkyl groups.

5. Polyamide compositions according to claim 3 in which the arylenediamine is an arylenediamine of the formula:

$$NH_2.\text{arylene } NRR'$$

in which R represents an aryl radial and R' represents a member selected from the group consisting of hydrogen atoms, alkyl groups and hydroxyl-substituted alkyl groups.

6. Polyamide compositions according to claim 1 in which Z is the residue of an aminodiphenylamine.

7. Polyamide compositions according to claim 6 in which the aminodiphenylamine is an aminodiphenylamine of the formula:

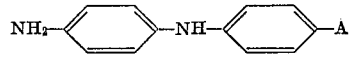

in which A represents a member selected from the group consisting of hydrogen atoms and alkyl groups having from 1 to 12 carbon atoms.

8. Polyamide compositions according to claim 1 which contain from 0.05 part to 5 parts by weight of the triazine per 100 parts by weight of polyamide.

9. Polyamide compositions as claimed in claim 1 wherein the fibre-forming synthetic linear polyamide is polycaprolactam.

10. Polyamide compositions as claimed in claim 4 wherein the alkyl groups are ethyl groups.

11. Polyamide compositions as claimed in claim 4 wherein the hydroxyl-substituted alkyl groups are β-hydroxyl ethyl groups.

12. Polyamide compositions as claimed in claim 7 wherein the alkyl groups are ethyl, t-butyl or t-octyl groups.

References Cited

UNITED STATES PATENTS 3,270,016   8/1966   Duennenberger et al. _ 260—45.8

DONALD E. CZAJA, *Primary Examiner.*

M. J. WELSH, *Assistant Examiner.*